United States Patent Office 3,519,689
Patented July 7, 1970

---

3,519,689
PROCESS FOR THE PREPARATION OF POLYTHIOETHER DIOLS
Bernard Audouze, Orthez, and Yves Labat, Gelos, France, assignors to Societe Nationale des Petroles d'Aquitaine
No Drawing. Filed May 8, 1967, Ser. No. 636,652
Claims priority, application France, May 9, 1966, 60,811
Int. Cl. C07c *149/36*
U.S. Cl. 260—609      5 Claims

---

ABSTRACT OF THE DISCLOSURE

This invention relates to a process for manufacturing polythioether diols of the general formula $$HO(CH_2S)_m CH_2OH$$

in which $m$ varies over a wide range, the process consisting of combining formaldehyde with $HS(CH_2S)_n H$, wherein $n = m - 1$.

---

Polythioether diols are useful industrial products which are employed at the present time in various polycondensation reactions, for example, with urea, melamine or phenol, with the object of obtaining resins; they are also used in the production of polyesters, polyurethanes, polycarbonates or other polymers which contain sulphur. As the qualities of the polymers obtained depend on the composition of the polythioether diols which are used, and as it is desirable that these latter should have a well-defined and constant content of —$CH_2S$ groups, it is important to have available a manufacturing process which is capable of leading to compounds which are as pure as possible and which fully conform to the empirical formula indicated above.

Now the known manufacturing process, which consists in introducing $H_2S$ into aqueous formaldehyde, as described in French patent specification No. 1,394,209, leads to polythioether diols in which a part of the sulphur of the $CH_2S$ groups is replaced by oxygen. This process can only give mixtures of compounds containing $CH_2O$ and $CH_2S$ groups, such as, for example, a mixture of $HO(CH_2S)_2CH_2OH$ and $HO(CH_2S—CH_2O)CH_2OH$.

The present invention, on the contrary, makes it possible to obtain true polythioether diols which no longer contain $CH_2O$ groups; it makes possible the preparation of products in which the number $m$ of $CH_2S$ groups is well-defined and corresponds closely to a desired value, in particular a value from 2 to 5. The composition of the products thus corresponds closely to compounds which are extremely useful for the applications mentioned above.

The new process consists in causing formaldehyde to react with one or more monothioether or polythioether dithiols at a temperature between 0° and 100° C., without a catalyst, so as to achieve the reaction:

$$HS(CH_2S)_n H + 2CH_2O \rightarrow HO(CH_2S)_m CH_2OH$$

in which $m = n + 1$.

It is known that the action of formaldehyde on dithiols, in the presence of acid or basic catalysts, leads to the formation of sulphur polymers; the present invention is based on the unexpected discovery that, if the reaction tubes place in the absence of a catalyst and preferably with a molar ratio between HCHO and dithiol at least equal to 2 (and more preferably slightly higher than 2), then instead of polycondensation, there occurs the replacement of the thiol groups —SH by hydroxyl groups —OH, in accordance with the transformation given above.

The formaldehyde can be advantageously employed in its most usual commercial form, that is to say, in solution in water, generally containing methanol. These solutions more often than not have a pH value of about 3 to 4, which is very suitable for carrying out the process according to the invention. Commercial solutions generally titrate about 28% to 45% by weight of HCHO, but the process according to the invention can be carried into effect with different formaldehyde concentrations, for example, from 5 to 50%.

The preferred procedure consists in introducing the polythioether dithiol or dithiols into the formaldehyde solution while stirring strongly, taking care that there is always a small amount of free HCHO in the reaction medium.

The separation of the resultant diols from the solution in which they have been formed is easily achieved; depending on their nature, that is to say, according to the value of $m$, they either precipitate spontaneously during preparation, or they separate from the aqueous phase after cooling of the medium. It is thus sufficient to filter and wash the product with water.

Those polythioether diols which are soluble in water can be purified by dissolving in hot water and re-precipitating by cooling.

For the purposes of manufacture in accordance with the invention, it is possible to use one of the various monothioether and polythioether dithiols which it is possible to obtain at the present time, or mixtures of these compounds. In particular, it is possible to employ one or more dithiols in which the number $n$ of —$CH_2S$— groups is from 1 to 30. The manufacturing process is of particular interest industrially when starting with dithiols in which $n$ is from 1 to 5 and in particular 3 or 4.

The polythioether diols obtained according to the invention are products which are solid at normal temperature, contrary to the first homologue, i.e. monothioether glycol HO—$CH_2S$—$CH_2OH$, which is liquid. The melting points of the solid compounds cannot be sharply determined because of the change which these products undergo during their heating; the melting points are thus indicated only with a certain degree of approximation in the remainder of the present description.

The following examples illustrate the invention without, however, limiting it. In these examples, the yields of the resultant dithiols are practically the quantities which would be expected by calculation.

EXAMPLE 1

Preparation of dithioether diol

Into a two-litre spherical flask, equipped with a funnel for the introduction of dithiol and also with a thermometer tube, and immersed in a thermostatically controlled bath, there is poured 728 g. of a 33% aqueous solution of formaldehyde HCHO (i.e. 8 mols). The solution is cooled to about 10 to 15° C.; 320 g. (4 mols) of methane dithiol HS—$CH_2$—SH is added. The reaction is exothermic. It is unnecessary to stir, because in order to avoid the reaction becoming too violent, it is preferable to allow it to develop at the interface of the formaldehyde and methane dithiol phases. Too rapid a reaction would give rise to products having a longer chain than that of the desired dithioether diol. The medium is kept for one hour between 10° and 15° C., after which the temperature is permitted to return to ambient temperature (25 to 30° C.). When the medium appears to be homogeneous, all the methane dithiol will have reacted with the formaldehyde and the medium is stirred for a few moments in order to complete homogenisation. The aqueous solution obtained is cooled with an ice bath. The dithioether glyccl precipitates and 400 g. of product are filtered off and dried; it has the characteristics which are set out below in the general table.

EXAMPLE 2

Preparation of trithioether diol

The same equipment as in Example 1 is used, provided with a condenser and an agitator 560 g. of a 30% aqueous formaldehyde solution (i.e. 5.6 mols) is introduced into the flask and, while stirring, 320 g. of dithioether dithiol $HS(CH_2S)_2H$ (i.e. 2.52 mols) is introduced. The temperature of the bath is brought to 65° C., to 70° C., this temperature being maintained for two hours. The trithioether diol which forms is soluble in water at 65° C. It precipitates when the solution is cooled with an ice bath.

After filtration, drying and washing about 350 g. of product is collected, purified by washing with water and recrystallised, it has the characteristics indicated in the table.

EXAMPLE 3

Preparation of tetrathioether diol

Using the same equipment as in Example 2, 632 g. of a 38% aqueous formaldehyde solution (i.e. 8 mols) is introduced, this being followed, while stirring, by 688 g. of trithioether dithiol $HS(CH_2S)_3H$ (i.e. 4 mols).

The mixing is effected at ambient temperature and then the mixture is brought to 100° C. and maintained at this temperature for 2 hours.

The water is separated by distillation.

The remaining product is dissolved in acetone, from which it precipitates by cooling. It is filtered and dried and the purified product, which is tetrathioether diol $HO(CH_2S)_4CH_2OH$, has the characteristics set out in the table.

EXAMPLE 4

Preparation of polythioether diol wherein $m=4.69$ 300 g. of an aqueous 30.8% formaldehyde solution, diluted to 10% with 618 g. of distilled water, is poured into a two-litre glass reactor which is equipped with an efficient agitator and a reflux condenser and which is immersed in a thermostatically controlled bath. The solution is brought to 40° C., and, while stirring vigorously, 204 g. (1 mol) of a polythioether dithiol composition having the overall formula $HS(CH_2S)_{3.69}H$ is introduced.

After 15 minutes, solidification of the mixture occurs. The products of the reaction are washed several times with water and dried. The product is purified by being dissolved in acetone, from which it precipitates by cooling.

The analysis of the purified product is set out in the table.

EXAMPLE 5

Preparation of polythioether diol wherein $m=4.69$

A 30% formaldehyde solution (12.5 mols) is poured into a 5-litre reactor equipped with an agitator, a reflux condenser and a funnel for the introduction of liquid. This solution is brought to 80 to 90° C. 5 mols of polythioether dithio $HS(CH_2S)_{3.69}H$ are introduced while stirring vigorously. Reaction is allowed to take place for 30 minutes at this temperature, and then the water is distilled, the condenser having been placed in the descending position. The external bath is brought to 110° to 120° C. The distillation of the water and of the formaldehyde in excess is completed in vacuo.

The product obtained gives an analysis substantially identical with that which was obtained in Example 4: C, 25.90%; S, 59.0%; R, 5.40%; OH, 11.6%.

GENERAL TABLE

The characteristics of the products prepared according to the preceding examples are set out in the following table. In the table:

$m$ is the number of $CH_2S$ groups in the diol $$HO(CH_2S)_mCH_2OH$$

which is prepared;
N is the molecular weight;
M.P.° indicates the melting point in ° C.;
$\not=$ signifies that the value given is only approximate;
ca.=calculated;
fd.=found.

| Example | $m$ | | C | H | S | OH | N | M.P.° |
|---|---|---|---|---|---|---|---|---|
| 1 | 2 | ca | 25.7 | 5.7 | 45.7 | 24.28 | 140 | $\not=$60 |
|   |   | fd | 25.9 | 6.2 | 46.8 | 23.0 | 145 |   |
| 2 | 3 | ca | 25.8 | 5.38 | 51.61 | 18.28 | 186 | $\not=$90 |
|   |   | fd | 26.3 | 5.4 | 51.5 | 18.5 | 194 |   |
| 3 | 4 | ca | 25.86 | 5.17 | 55.17 | 14.75 | 232 | $\not=$100 |
|   |   | fd | 26.1 | 5.0 | 55.6 | 14.2 | 225 |   |
| 4 | 4.69 | ca | 25.8 | 5.1 | 57.0 | 12.9 | 264 | $\not=$105 |
|   |   | fd | 25.72 | 5.55 | 58.80 | 11.70 | 280 |   |
| 5 | 4.69 | ca | 25.8 | 5.1 | 57.0 | 12.9 | 264 | $\not=$105 |
|   |   | fd | 25.72 | 5.55 | 58.80 | 11.70 | 280 |   |

We claim:
1. A process for the manufacture of compounds of polythioether diols having the formula

$$HO(CH_2S)_mCH_2OH$$

in which $m$ is in the range from 2 to 31 consisting essentially of reacting at least two moles of formaldehyde in aqueous solution with one mole of $HS(CH_2S)_nH$ in which $n=m-1$, without a catalyst, at a temperature of 0° to 100° C. and then separating the compounds formed from said solution.

2. A process as recited in claim 1, wherein $n$ lies in the range from 1 to 5.

3. A process as recited in claim 1 wherein the said solution contains formaldehyde in the range from 5 to 50%.

4. A process as recited in claim 1, wherin the pH of the solution lies in the range from 3 to 4.

5. A process as recited in claim 4, wherein the said solution contains formaldehyde in the range from 5 to 50% and the pH lies in the range from 3 to 4.

References Cited

Bohne "Liebigs Ann. der. Chemie," vol. 620 (1959), pp. 1–6.

Walker "Formaldehyde," third ed. (1964), p. 279.

CHARLES B. PARKER, Primary Examiner

D. R. PHILLIPS, Assistant Examiner